US007338051B2

(12) United States Patent
Buchholz

(10) Patent No.: US 7,338,051 B2
(45) Date of Patent: Mar. 4, 2008

(54) TOOL HOLDER FOR A ROTARY HAMMER

(75) Inventor: Achim Buchholz, Limburg (DE)

(73) Assignee: Black & Decker Inc., Newark, DE (US)

(*) Notice: Subject to any disclaimer, the term of this patent is extended or adjusted under 35 U.S.C. 154(b) by 273 days.

(21) Appl. No.: 10/712,933

(22) Filed: Nov. 13, 2003

(65) Prior Publication Data

US 2005/0116428 A1 Jun. 2, 2005

(30) Foreign Application Priority Data

Nov. 14, 2002 (GB) ................................ 0226524.7

(51) Int. Cl.
*B23B 31/107* (2006.01)
*B25D 17/08* (2006.01)
*B28D 1/14* (2006.01)

(52) U.S. Cl. ......................... 279/19; 279/19.5; 279/74; 279/82

(58) Field of Classification Search ............... 279/19.3, 279/19.4, 19.6, 19, 19.5, 74, 82; 408/240
See application file for complete search history.

(56) References Cited

U.S. PATENT DOCUMENTS 3,013,804 A * 12/1961 Zandberg et al. ............. 279/74
3,866,746 A 2/1975 Currington
3,964,552 A 6/1976 Slator
4,106,573 A * 8/1978 Bailey ........................ 173/106
4,197,645 A * 4/1980 Scheicher .................... 433/128
4,206,820 A * 6/1980 Bailey et al. ............... 173/105
4,378,053 A * 3/1983 Simpson ...................... 173/13
4,512,692 A * 4/1985 Nielsen ...................... 408/226
4,619,460 A 10/1986 Rohm
4,691,929 A * 9/1987 Neumaier et al. ......... 279/19.3
4,702,326 A 10/1987 Salmi et al.
4,981,180 A 1/1991 Price (Continued)

FOREIGN PATENT DOCUMENTS

DE 19958342 A1 6/2001

(Continued)

*Primary Examiner*—Monica Carter
*Assistant Examiner*—Michael W. Talbot
(74) *Attorney, Agent, or Firm*—Michael P. Leary; Charles E. Yocum; Adan Ayala

(57) ABSTRACT

A tool holder (1) for a rotary hammer which has a tube like tool holder main body (10) having a side wall formed with through holes (11) for receiving corresponding locking bodies (12) and formed with additional through holes (40). The tool holder includes hardened metal driving ribs (46) each located on an insert (42) and the inserts are fitted within the additional through holes (40) so that the ribs extends axially and radially inwardly of the radially inward facing surface of the holder body. The locking bodies (12) are arranged to releaseably engage a corresponding axial closed groove of a tool or bit inserted within the tool holder and the ribs (46) are arranged to releaseably engaging a corresponding axial rearwardly open driving grooves of a tool or bit inserted within the tool holder. To simplify the process for forming the tool holder body (10) each additional through hole (40) is formed by at least two overlapping axially offset circular cross-sectioned through holes (40*a*, 40*b*) and the corresponding insert has a base (44) shaped to fit the through hole (40).

21 Claims, 2 Drawing Sheets

U.S. PATENT DOCUMENTS 5,009,440 A * 4/1991 Manschitz .................. 279/71
5,011,341 A 4/1991 DeGroff
5,016,892 A 5/1991 Lafforgue et al.
5,150,995 A 9/1992 Reinauer
5,286,145 A * 2/1994 Kleine ........................ 408/226
5,517,746 A 5/1996 Cox et al.
5,700,018 A 12/1997 Bongers-Ambrosius et al.
5,709,391 A * 1/1998 Arakawa et al. ........... 279/19.4
5,709,393 A * 1/1998 von Keudell et al. ......... 279/97
6,092,814 A * 7/2000 Kageler ..................... 279/19.4
6,669,206 B2 * 12/2003 Hanke ....................... 279/19.4
2003/0006566 A1 * 1/2003 Below et al. .............. 279/19.4
2004/0005200 A1 * 1/2004 Heule et al. ................ 408/173

FOREIGN PATENT DOCUMENTS

EP 13646 A1 * 7/1980
EP 0335795 A1 10/1989
EP 1108504 A1 6/2001
GB 2395158 A * 5/2004

* cited by examiner

TOOL HOLDER FOR A ROTARY HAMMER

The present invention relates to a tool holder for a rotary hammer.

BACKGROUND OF THE INVENTION

Such tool holders generally have a main tube like body with an open forward end within which a chisel tool or drill bit may be inserted. The tool or bit is generally formed with at least one axially extending closed groove towards the rearward end of the tool shank. The tube like body of the tool holder is generally formed with at least one through hole, within the or each of which is located a locking body. The locking body is arranged so that it can be radially displaced between a radially inward locked position and a radially outward unlocked position. The locking body is generally held in the locked position by a locking ring of the tool holder, and in the locked position the locking body engages within the closed groove of the tool or bit. The closed groove is generally axially longer than the locking body and so the tool or bit is locked in the tool holder main body so as to be able to reciprocate by a limited amount with respect to the tool holder body. In the unlocked position, the locking body can disengage the closed groove in the tool or bit and a tool or bit can be removed from or inserted into the tool holder.

In addition to the at least one axial groove closed at both ends, the tools or bits insertable in such a tool holder generally have at least one further axial driving groove offset with respect to the axial closed groove or grooves. The further driving groove or grooves are each open at the rear end of the shank of the tool or bit and when the tool or bit is inserted into the tool holder the driving groove or grooves are each engaged by an axial driving rib of the holder body, by means of which the torque for rotation of the tool or bit is transferred to the tool or bit. Such drill bits are known, for example, as so-called SDS-Plus and SDS-Max drill bits.

The axial driving ribs of the tool holder are generally formed on the tool holder and extend radially inwardly of the inner surface of the tool holder main body. When the hammer to which the tool holder is fitted is used in a hammering mode, the tool or bit reciprocates and so the axial driving groove, which engages the axial driving rib reciprocates with respect to the driving spline causing a considerable amount of wear, especially in a rotary hammer mode in which torque is transmitted from the driving rib to the driving groove. The wear means that the tool holder may have to be replaced by a new tool holder after prolonged use of the tool holder.

This problem has been addressed in U.S. Pat. No. 5,700, 018 by replacing the driving ribs with driving elements shaped as rolling bodies, such as cylinders, which rolling bodies are mounted within the tool holder main body so that a portion of the rolling body extends radially inwardly of the inner surface of the tool holder main body. The rolling bodies are arranged to engage corresponding driving grooves of a tool or bit in order to transmit torque. The rolling bodies are mounted within the tool holder body in such a way that they are able to roll along the driving grooves of the tool or bit as the tool or bit reciprocates within the tool holder. This rolling movement of the rolling bodies reduces wear on the rolling bodies and so extends the life of the tool holder. A problem with this is that a non-standard tool or bit is required with driving grooves specially shaped to engage the rolling bodies.

The same problem has also been addressed in EP335,795 and DE199 58 342. In EP335,795 a driving rib insert of hard material is fitted into a corresponding recess in the tool holder body. The recess extends radially from the inner to the outer surface of the tool holder main body and is formed as rectangular opening with outwardly tapering sides. The tapering of the recess prevents the insert from falling into the inside of the tool holder body. The insert is locked in place by a locking ring of the tool holder. The insert is formed with an axially extending driving rib, which when the insert is fitted into the recess, extends radially inwardly of the inner surface of the tool holder body. Thus, the rib is engageable with the driving groves of a standard type of tool or bit. While EP335,795 provides hard wearing driving ribs, the recess in the tool holder main body is of complex shape and relatively difficult to machine.

In DE199 58 342 a driving rib insert of hard material is fitted into the tool holder main body by machining in the walls of the tool holder main body recesses extending axially along the body, which recesses communicate with the central opening of the main body. The insert is then slideably inserted into the axially extending recesses. The insert is formed at its rearward end with a driving rib which extends radially inwardly of the inner surface of the main body so as to be engageable with a driving groove of a conventional tool or bit. The insert is fixed in place by for example, welding, adhesion or soldering. Again, DE199 58 342 provides hardened driving ribs, however, the axially extending recesses undermine the structural strength of the forward end of the tool holder main body. Also, the driving insert is subject to axial vibration due to the relative reciprocation between the driving groove and the rib, which can weaken the fixing between the insert and the tool holder body. The driving insert is a relatively large part, and as it is made of carbide material then it is relatively expensive.

BRIEF DESCRIPTION OF THE INVENTION

The object of the invention is to produce a tool holder with driving ribs which are wear resistant, robust and enable a simple construction of the tool holder.

According to a first aspect of the present invention there is provided a tool holder for a rotary hammer, comprising:

a tube like tool holder main body having a side wall formed with at least one through hole for receiving a locking body for releaseably engaging a corresponding axial closed groove of a tool or bit inserted within the tool holder and formed with at least one additional through hole;

at least one hardened metal driving rib located on an insert, the or each of which inserts is fitted within a corresponding additional through hole so that the rib extends axially and extends radially inwardly of the radially inward facing surface of the holder body for releasably engaging a corresponding axial rearwardly open driving groove of a tool or bit inserted within the tool holder;

characterised in that the or each additional through hole is formed by at least two overlapping axially offset circular cross-sectioned through holes and the corresponding insert has a base shaped to fit the through hole.

The additional through holes for receiving the inserts are formed by simply drilling two or more axially offset circular cross sectioned through holes through the wall of the tool holder main body (holder body). The same drilling tool can be used for drilling each circular cross sectioned hole, with the tool or the holder body being moved axially between drilling operations. For longer driving ribs a greater number of circular cross-sectioned holes can be drilled in order to minimise the circumference of the additional holes in order to maintain the structural strength of the holder body. The circular cross-sectioned holes may each have the same diameter.

The overlapping axially offset circular through holes may be circumferentially aligned on the holder body, this enables the maximum length of axially extending driving rib to be achieved for a set diameter of through hole. Further, the or each additional through hole may be circumferentially offset with respect to the or each through hole for receiving a locking body in order to correspond to one of the standard tool or bit shank configurations.

In one embodiment the or each additional through hole is formed by two overlapping axially offset circular cross-sectioned through holes.

In order to simplify the drilling of the circular through holes each circular cross-sectioned hole may have a cross-section with a constant diameter from the radially outer to the radially inner surface of the holder body.

The or each insert may be secured in the corresponding additional through hole in the holder body by any convenient method, for example by adhesion, press fitting, soldering or welding, for example laser welding.

The hardened metal rib may be separate from the insert and fixed to the insert, which insert may be made out of a different material. In one embodiment the or each rib is formed integrally with the insert and the insert is made of hardened metal. The hardened metal may, for example, be a metal which is harder than the material making up the spindle, such as carbide material.

In one embodiment the base of the or each insert is shaped like a number, corresponding to the number of circular cross-sectioned holes, of overlapping solid cylinders arranged side by side with their axes parallel. Where there are two circular through holes, the base will have an end face shaped as two overlapping circles with a waist and the rib may extends lengthwise across said end face. In one embodiment the rib does not extend, axially or circumferentially (with respect to the holder body, when the insert is fitted in the holder body) beyond the end face of the base. This means that the width of the rib (in the circumferential direction with respect to the holder body, when the insert is fitted in the holder body) defines a minimum width for the waist portion of the end surface.

According to a second aspect of the present invention there is provided a tube like tool holder main body of a tool holder suitable for a rotary hammer formed with at least one through hole suitable for receiving a corresponding locking body of a tool holder and formed with at least one additional through hole suitable for receiving at least one hardened metal driving rib insert of a tool holder characterised in that the or each additional through hole is formed by at least two overlapping axially offset circular cross-sectioned through holes. A tool holder incorporating the holder body will have the same advantages as the tool holder according to the first aspect of the present invention. The holder body may have the subsidiary features described above in relation to the holder body of the tool holder according to the first aspect of the present invention.

According to a third aspect of the present invention there is provided a driving rib insert for the holder body described above comprising at least one hardened metal driving rib located on a base of the insert which base is shaped to fit a corresponding additional through hole in the holder body so that the rib extends axially and radially inwardly of the radially inward facing surface of the holder body. A tool holder incorporating the driving rib insert will have the same advantages as the tool holder according to the first aspect of the present invention. The driving rib insert may have the subsidiary features described above in relation to the driving rib insert of the tool holder according to the first aspect of the present invention.

According to a fourth aspect of the present invention there is provided a method of securing a driving rib insert as described above to a holder body as described above, comprising the steps of;

inserting the insert into the corresponding additional through hole so that the rib of the insert extends axially and extends radially inwardly of the radially inward facing surface of the holder body; and securing the insert in the additional through hole by a suitable method such as press fitting, adhesion, soldering or welding.

According to a fifth aspect of the present invention there is provided a method of forming the additional through holes in a holder body as described above comprising the steps of:

drilling a first of the plurality of the circular cross-sectioned through holes using a drilling tool;

altering by a predetermined axial distance the relative positioning of the drilling tool and the holder body; and drilling a second of the plurality of the circular cross-sectioned through holes using the drilling tool;

wherein the predetermined distance is set so that the first and second circular cross-sectioned holes overlap.

BRIEF DESCRIPTION OF THE DRAWINGS

The invention is explained in detail in the following with reference to the Figures illustrating an exemplary embodiment.

DETAILED DESCRIPTION OF THE INVENTION

Figure 2:
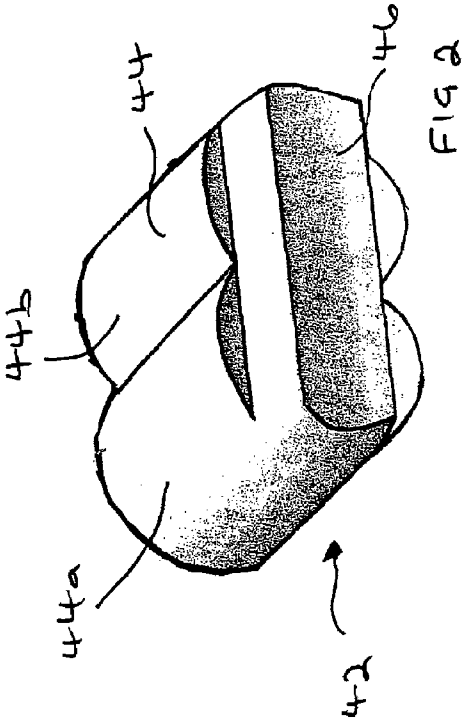
FIG. 2 shows a perspective view of a driving rib insert used in the tool holder of FIG. 1.
Figure 1:
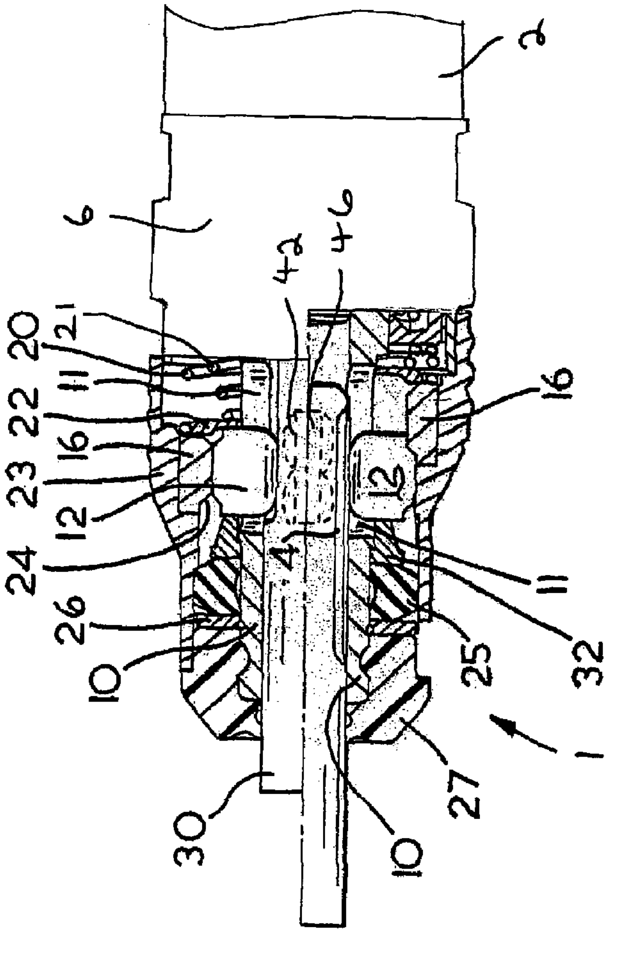
FIG. 1 shows a cross section of a tool holder according to the present invention fitted to the front part of a rotary hammer with the tool holder in a locked position in the upper half of FIG. 1 and the tool holder in an unlocked position in the lower half of FIG. 1.

The tool holder 1 shown in FIG. 1 has a tube-like tool holder main body 10, which has a continuous coaxial receiving opening. The holder body 10 sits with its rear end in a housing part 2, consisting of metal, of a rotary hammer, not otherwise shown. A tool or bit fitted within the tool holder will receive repeated impacts on its rearward end by the hammering mechanism of the hammer, as is well known in the art, when the rotary hammer is operated in a hammer only or a rotary hammer mode. In addition rotary drive will be transmitted to the tool holder by the rotary drive train of the hammer, as is well known in the art, and thereby to a tool or bit mounted within the tool holder, when the hammer is operated in a drilling only or a rotary hammer mode.

On the front end of the housing part 2 there is seated an alignment sleeve 6, which, in a manner not shown specifically, is in interlocking engagement with the housing part 2 and is in interlocking engagement with the holder body 10, so that the latter is held locked against rotation relative to the housing part 2 and hence relative to the hammer. The sleeve 6 can be actuated, in a manner which is known in the art, so as to alter the orientation of a chisel tool fitted within the tool holder 1 with respect to the housing part 2.

In the front region of the tool holder main body 10, on opposite sides in the wall of the holder body there are formed axially extending through-openings 11, in which locking members 12, which can comprise, for example, sintered shaped bodies, are located. The locking members 12 are inserted into the through-openings 11 in such a way, and their cross-sectional shape and the cross-sectional shape of the receiving openings 11 are so matched to one another, that the locking members 12 can be displaced between a radially inner and a radially outer position, but so that when there is no tool or bit shank 30 inserted in the tool holder main body 10, the locking members 12 are not able to fall radially inwards right through the receiving openings 11.

The locking members 12 co-operate with a supporting ring 16. An outer spring 20 acts on the rear side of the supporting ring 16 and so the supporting ring 16 is consequently always spring-loaded in the forward direction. An inner spring 21 is arranged with its front end abutting a washer 22 which, in the position shown in FIG. 1, abuts both the rear end of the locking members 12 and the rear end of the supporting ring 16. In that position, the front end of the supporting ring 16 is supported against an adjusting sleeve 23 that surrounds it, which adjusting sleeve in this state abuts an annular damping arrangement 25, which is supported against a supporting washer 26 that is prevented from being displaced forwards a nose ring 27 made of elastic material and fitted over the forward end of the holder body 10.

Figure 3:
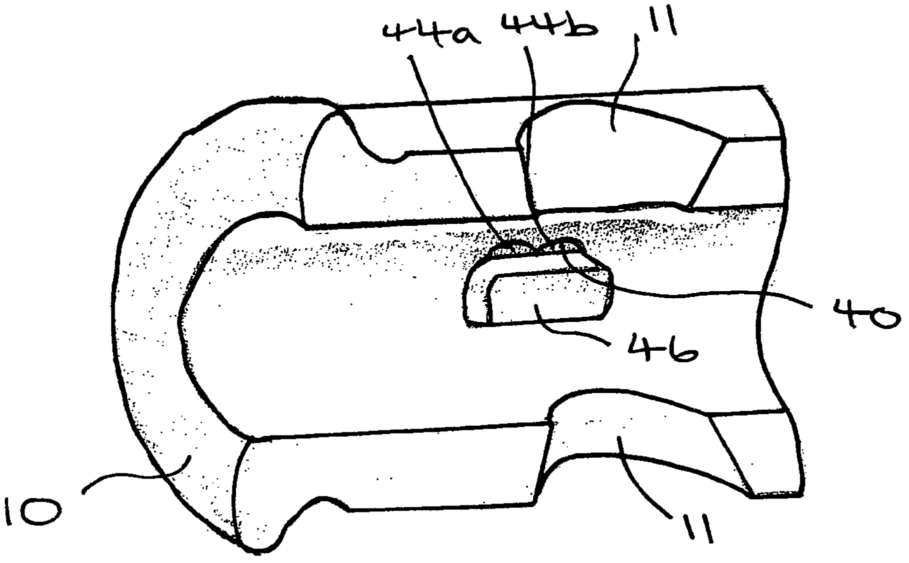
FIG. 3 shows a cut away perspective view of the inside of the tool holder main body of the tool holder of FIG. 1 with the driving rib insert of FIG. 2 fitted in it.
Figure 4:
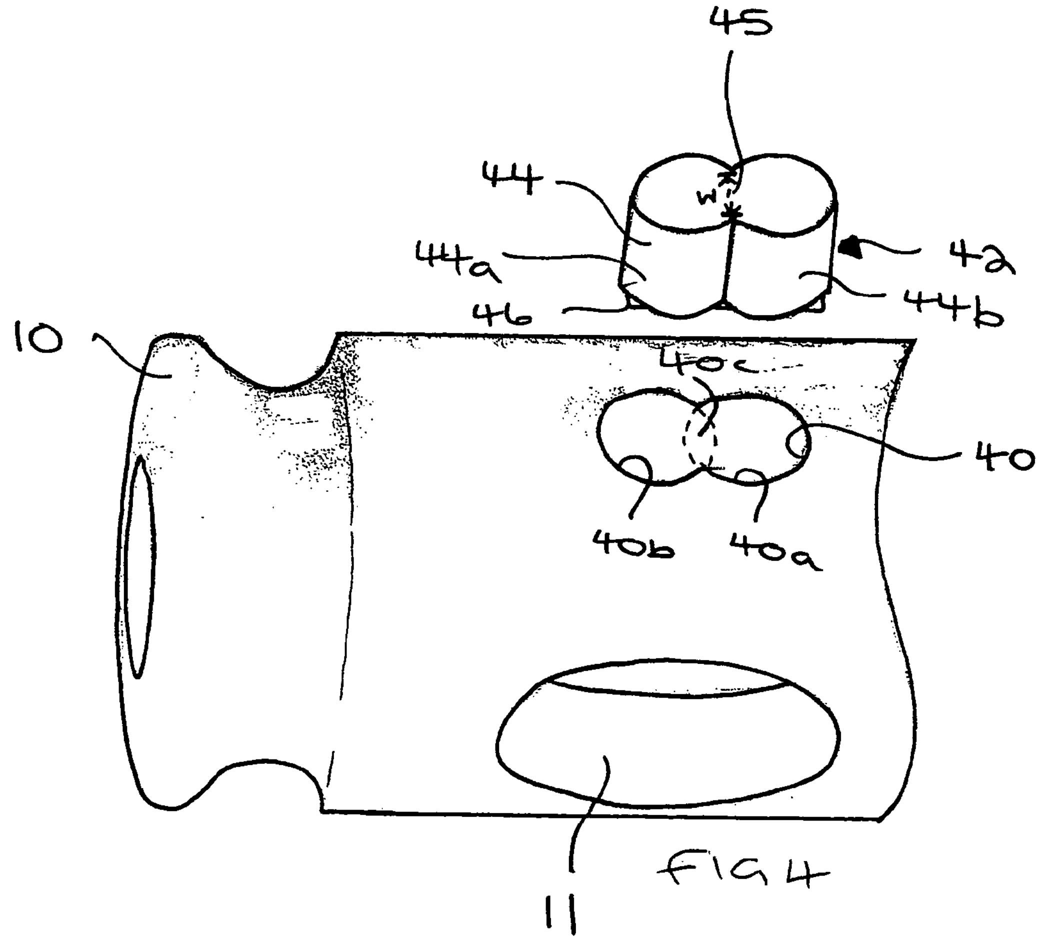
FIG. 4 shows a perspective view of the outside of the tool holder main body shown in FIG. 3 with the driving rib insert of FIG. 2 about to be fitted in it.

As can best be seen in FIGS. 3 and 4, the tool holder main body 10 is formed in its side wall with an additional pair of through openings 40 circumferentially offset by 90° with respect to the through openings 11. Each through opening is formed by machining two circular cross-sectioned holes 40*a*, 40*b* (with circumference of holes shown in full and dotted lines) located in the same circumferential position on the holder body 10 but with one of the holes axially offset with respect to the other on the holder body 10 so that the two circular holes overlap in region 40*c*. The two holes 40*a*, 40*b* have the same diameter. The resulting through hole has a cross-section of a two overlapping circles with a waist and extends in the axial direction. Each hole 40*a*, 40*b* extends in the radial direction (with respect to the longitudinal axis of the holder body 10) from the radially outer surface of the holder body 10 to the radially inner surface of the tool holder body and so is simple to machine.

A driving rib insert 42 made of carbide material is inserted into each through hole 40. Each driving rib insert is formed with a base 44 shaped as two cylinders arranged side by side with the axes of the cylinders parallel and with the adjacent edges of the cylinders overlapping. The diameter of each cylinder 44*a*, 44*b* is the same as the diameter of the overlapping through holes 40*a*, 40*b* and so the base 44 of the insert fits the through hole 40. The base 44 is secured in the through hole, for example by press-fitting, adhesion, soldering or welding. A driving rib 46 is formed across one end face of the base 44 so as to extend over an end face of each of the overlapping cylinders 44*a*, 44*b* forming the base. When the base 44 is fitted within the recess 40 the driving rib 46 extends axially and extends radially inwardly of the inner surface of the holder body 10. The rib 46 does not extend, axially or circumferentially (with respect to the holder body, when the insert is fitted in the holder body) beyond the end face of the base. Accordingly, the width of the rib (in the circumferential direction with respect to the holder body, when the insert is fitted in the holder body) defines a minimum width (W) for the waist portion 45 of the end surface.

The shank 30 of a tool or bit is formed with two opposing axial grooves 4 closed at both ends and with two opposing axial driving grooves, open at the rearward end of the shank and circumferentially offset with respect to the closed grooves. Such tools are well known in the art, for example under the SDS Plus or SDS Max designation. When the tool or bit is fitted within the tool holder 1, the radially inner portions of the locking members 12 extend into the axially closed grooves 11, and the locking members 12 are braced against radial outward displacement by supporting ring 16. The driving grooves in the shank 30 engage the driving ribs 46 of the inserts 42 so as to transmit torque between the holder body 10 and the tool or bit when the tool holder 1 is rotatingly driven. In operation in hammer mode, the tool or bit is able to move back and forth in the usual manner, commensurate with the axial extent of the axial grooves 4, but is held by the locking members 12 to prevent it from escaping from the receiving opening of the holder body 10.

To remove the tool or bit 30 from the tool holder 1, the user displaces the adjusting sleeve 23 by hand against the force of the outer spring 20 and the inner spring 21 out of the position shown in the upper half of FIG. 1 and into the position shown in the lower half of FIG. 1. During this displacement movement, the adjusting sleeve 23 takes the supporting ring 16 with it. When the supporting ring 16 reaches its rearward position the locking member 12 can be displaced radially outwards in the manner indicated in the lower half of FIG. 1.

In the position illustrated in the lower half of FIG. 1, the tool or bit can then, as indicated, be removed from the receiving opening of the holder body 10. When the adjusting sleeve 23 is afterwards released, the springs 20, 21 press the supporting ring 16, and the adjusting ring 23, forwards again into the position shown in the upper half of FIG. 1.

If the shank 30 of a tool or bit is inserted into the receiving opening of the holder body 10 then the rear end of the shank 30 comes into contact with the front end of the locking members 12. As the chisel shank 30 is introduced further, it displaces the locking members 12 axially rearwards the locking members 12 are able to yield radially outwards and move behind the supporting ring 16. In this position of the locking members 12, the rear end of the chisel shank 30 can slide past the locking members 12, until the locking members 12 are again located entirely in the region of the axial grooves 4 of the shank 30. Once this position has been reached, the pressure of the inner spring 21 causes the washer 22, and hence the locking members 12, to be displaced forwards again into the position shown in the upper half of FIG. 1, and the chisel is thus securely held in the receiving opening of the holder body 10 so that it has limited axial movement back and forth.

The invention claimed is:

1. A tool holder (1) for a rotary hammer, comprising:

a tube like tool holder main body (10) having a side wall including a radially inward facing surface and formed with a first through hole (11), for receiving a locking body (12) for releaseably engaging a corresponding axial closed groove of a shank inserted within the tool holder, and formed with a second through hole (40);

a hardened metal driving rib (46) located on an insert (42), the insert is fitted within the second through hole (40) so that the driving rib extends axially and extends radially inwardly of the radially inward facing surface for engaging a corresponding axial rearwardly open driving groove of the shank inserted within the tool holder; and characterized in that the second through hole (40) is formed by at least two overlapping axially offset circular cross-sectioned through holes (40$a$, 40$b$) and the corresponding insert has a base (44) shaped to fit the second through hole (40).

2. A tool holder according to claim 1 wherein the at least two overlapping axially offset through holes (40$a$, 40$b$) are circumferentially aligned on the holder body.

3. A tool holder according to claim 1 wherein the second through hole (40) is circumferentially offset with respect to the first through hole (11) for receiving a locking body (12).

4. A tool holder according to claim 1 wherein the second through hole (40) is formed by two overlapping axially offset circular cross-sectioned through holes (40$a$, 40$b$).

5. A tool holder according to claim 1 wherein the side wall includes a radially outward facing surface and each circular cross-sectioned hole (40$a$, 40$b$) has a cross-section with a constant diameter from the radially outward facing surface to the radially inward facing surface of the tool holder main body (10).

6. A tool holder according to claim 1 wherein the insert (42) is secured in the second through hole (40) by at least one of press fitting, adhesion, soldering and welding.

7. A tool holder according to claim 1 wherein the rib (46) is formed on the insert (44) and the insert is made of hardened metal.

8. A tool holder according to claim 1 wherein the hardened metal driving rib is made of a carbide material.

9. A tool holder according to claim 1 wherein the base (44) of the insert (42) is shaped like a number of overlapping solid cylinders (44$a$,44$b$), the number of overlapping solid cylinders corresponding to the number of circular cross-sectioned through holes, and arranged side by side with their axes parallel.

10. A tool holder according to claim 9 wherein the base (44) has an end face shaped as two overlapping circles and the rib (46) extends lengthwise across said end face.

11. A tube like tool holder body (10) of a tool holder suitable for a rotary hammer having a side wall formed with a first through hole (11) suitable for receiving a corresponding locking body (12) of a tool holder, and formed with a second through hole (40) suitable for receiving a hardened metal driving rib insert (42) of a tool holder, and characterised in that the second through hole (40) is formed by at least two overlapping axially offset circular cross-sectioned through holes (40$a$, 40$b$).

12. A tool holder body according to claim 11 wherein the at least two overlapping axially offset through holes (40$a$, 40$b$) are circumferentially aligned on the tool holder body.

13. A tool holder body according to claim 11 wherein the second through hole (40) is circumferentially offset with respect to the first through hole (11).

14. A tool holder body according to claim 11 wherein the second through hole (40) is formed by two overlapping axially offset circular cross-sectioned through holes (40$a$, 40$b$).

15. A tool holder body according to claim 11 wherein the tool holder body includes a radially outer surface and a radially inner surface, and each circular cross-sectioned through hole (40$a$, 40$b$) has a cross-section with a constant diameter from the radially outer surface to the radially inner surface of the tool holder body (10).

16. A driving rib insert (42) for a tubular tool holder body including a radially inward facing surface and a radially outward facing surface and formed with a through hole formed by at least two overlapping axially offset circular cross-sectioned through holes, the driving rib insert comprising at least one hardened metal driving rib (46) located on a base (44) shaped to fit the through hole (40) in the tool holder body so that the rib extends axially and extends radially inwardly of the radially inward facing surface of the tool holder body.

17. An insert according to claim 16 wherein the rib (46) is formed on the insert (44) and the insert is made of hardened metal.

18. An insert according to claim 16 wherein the hardened metal is carbide material.

19. An insert according to claim 16 wherein the base (44) of the insert (42) is shaped like a number of overlapping solid cylinders (44$a$,44$b$), the number of overlapping solid cylinders corresponding to the number of circular cross-sectioned through holes, and arranged side by side with their axes parallel.

20. An insert according to claim 19 wherein the base (44) has an end face shaped as two overlapping circles and the rib (46) extends lengthwise across said end face.

21. A method of securing a driving rib insert (42) to a tool holder body (10), comprising the steps of;

providing a tubular tool holder body comprising a radially inward facing surface and a radially outward facing surface, and defining a radially extending through hole formed as an axially extending series of partially overlapping cylindrical providing a driving rib insert comprising a rib and a base, the base formed of a series of partially overlapping cylinders and dimensioned to fit into the through hole in the tool holder body;

inserting the driving rib insert (42) into the through hole (40) so that the rib (46) of the insert extends axially and extends radially inwardly of the radially inward facing surface of the tool holder body; and securing the insert (42) in the through hole (40) by at least one of press-fitting, adhesion, soldering, and welding.

* * * * *